United States Patent Office 3,644,432
Patented Feb. 22, 1972

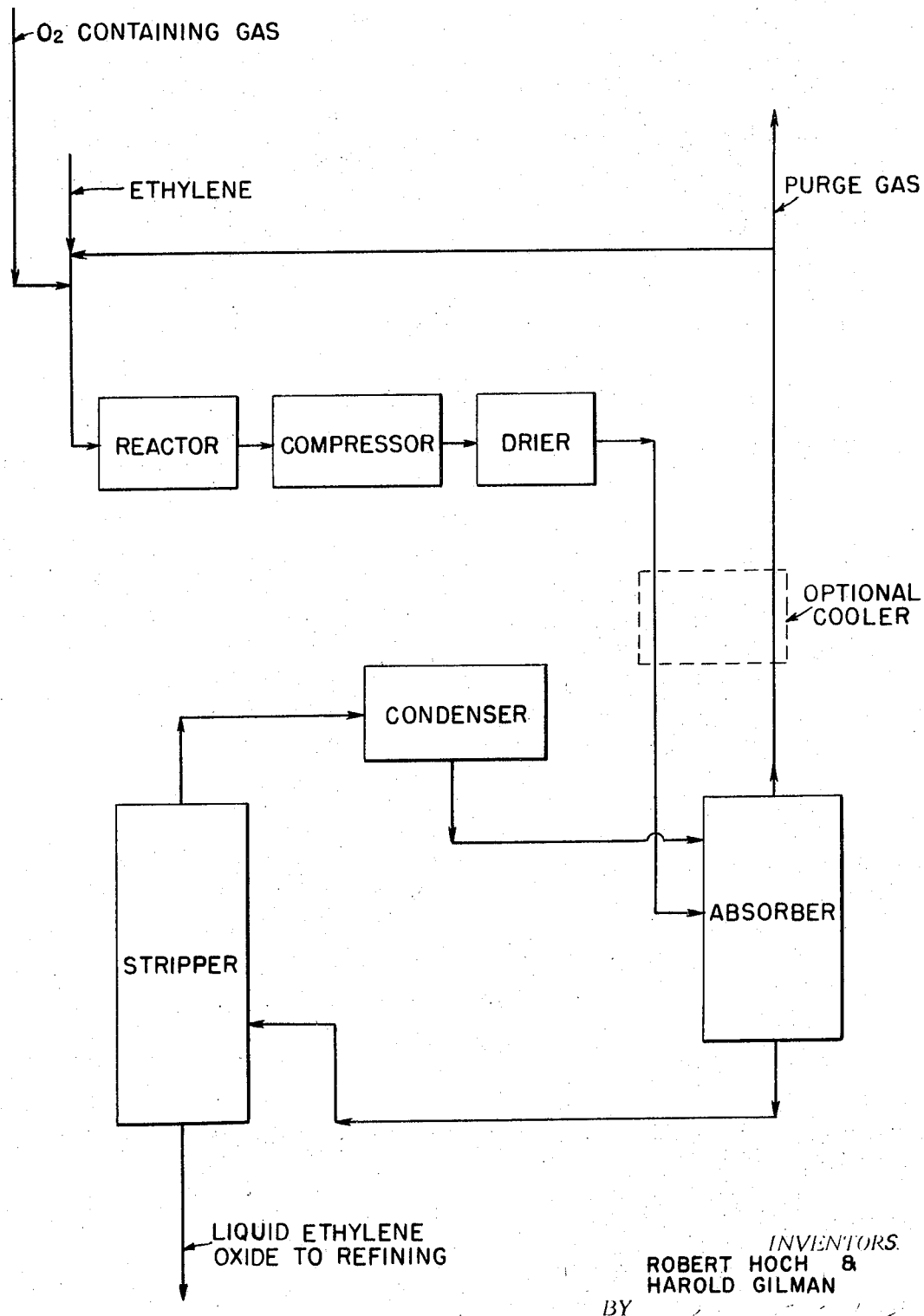

3,644,432
PROCESS FOR RECOVERING ETHYLENE OXIDE
Robert Hoch, Brooklyn, and Harold Gilman, Millwood, N.Y., assignors to Halcon International, Inc.
Continuation-in-part of application Ser. No. 651,012, July 3, 1967. This application Sept. 30, 1969, Ser. No. 862,341
Int. Cl. C07d 1/14
U.S. Cl. 260—348
4 Claims

ABSTRACT OF THE DISCLOSURE

This invention relates to a process for the recovery of ethylene oxide from the rich cycle gas resulting from the vapor phase reaction of ethylene with molecular oxygen under ethylene oxide forming conditions. Recovery is effected by scrubbing the rich cycle gas with a non-aqueous liquid absorbent in a dry system at cryogenic conditions and thereafter stripping the absorbent from ethylene oxide absorbate which is then refined to the desired product. Advantages of the process reside in the elimination of the usual glycol make accompanying recovery in an aqueous system and in the abtention of high ethylene oxide concentrations in the liquid phase. The inventive process may advantageously provide an absorbent inventory for continuous process operation by condensation and recycling of overhead absorbent from the stripper. The invention is of particular value in an ethane ballasted-high purity oxygen system utilizing liquid ethane as absorbent; the high ethane partial pressures may be availed of to raise the temperature level of the refrigeration required and thereby reduce its cost.

CROSS-REFERENCE TO RELATED APPLICATIONS

This application is a continuation-in-part of co-pending application Ser. No. 651,012, filed July 3, 1967. Additionally, it relates to the subject matter of co-pending application Ser. No. 840,838 filed July 10, 1969.

BACKKGROUND OF THE INVENTION

This invention relates to a process for the production of ethylene oxide, and particularly, to a process for recovering ethylene oxide from the gaseous effluent of the vapor phase reaction of ethylene and oxygen. More particularly, the invention relates to the recovery of ethylene oxide of such reaction by scrubbing the rich cycle gas, which comprises the reactor effluent, with a liquid absorbent in a dry system at cryogenic conditions.

DESCRIPTION OF THE PRIOR ART

The production of ethylene oxide by the partial oxidation of ethylene is well-known and the prior art is replete with processes employing a variety of techniques and conditions to effect improved efficiency and economy in the production and recovery of ethylene oxide.

Commercially, ethylene oxide is produced by the silver-catalyzed, controlled oxidation of ethylene with molecular oxygen. In general, a reaction mixture comprising ethylene, molecular oxygen and inert ballast gas, such as nitrogen, argon, methane, ethane, carbon dioxide, etc. or mixtures thereof is introduced to a reaction zone at ethylene oxide forming conditions and the gaseous effluent is scrubbed with water to absorb ethylene oxide. The scrubbed effluent gas, lean in ethylene oxide, is purged in part and the remainder is recycled to the reaction zone. Where the source of the molecular oxygen is of high purity (as contrasted with air) an additional slipstream of lean cycle gas is drawn off for carbon dioxide removal and then returned. In an air process, using for example, a mixed nitrogen, carbon dioxide, ethane ballast, the purge gas may be of sufficient quantity to justify its use as feed to a purge reactor. Ethylene oxide product is recovered from the rich aqueous solution as overhead from a subsequent stripping operation and optionally, the aqueous stripper bottoms may be recycled to the scrubber.

The separation of ethylene oxide from other reaction products in the cycle gas is, as indicated, universally accomplished by waer scrubbing. Obviously, the choice of water as an absorbent is dictated by such considerations as ready availability and low cost. In addition, such choice permits of an economical stripping operation since the stripper overhead consists essentially of the ethylene oxide absorbate which is the lighter component comprising but a small fraction of the stripper feed. However, the choice of water as an absorbent is not unattended by disadvantages. Prominent among these disadvantages is the loss of ethylene oxide product by hydrolysis to ethylene glycol, the quality of which is poor and the recovery of which is difficult. Moreover, water's high freezing level precludes the maintenance of cryogenic scrubbing conditions at which low ethylene oxide vapor pressures, favoring absorption, prevail. In the light of the relatively low absorption power of water for ethylene oxide and the relatively high molar latent heat of vaporization of water, it is clear that the recovery portion of the ethylene oxide production process has much room for improvement in the sense of obtaining improved process economics. The potential for economic improvement is further increased by the corrosivity consideration since the choice of water as absorbent necessitates the use of stainless steel equipment.

OBJECTS OF THE INVENTION

Accordingly, a principal object of the present invention is to provide a process for the production of ethylene oxide which is unattended by the foregoing disadvantages of the prior art.

Another object of the invention is to provide a process for the production of ethylene oxide wherein loss of ethylene oxide product by hydrolysis thereof to ethylene glycol during the ethylene oxide recovery is minimized.

A further object of the invention is to provide a process for the recovery of ethylene oxide from the products of the vapor phase reaction of ethylene and molecular oxygen wherein cryogenic scrubbing conditions may be maintained to improve ethylene oxide absorption.

Other objects of the invention will be apparent from the following detailed description and the accompanying drawing.

SUMMARY OF THE INVENTION

The present invention is directed to a process for recovering ethylene oxide from the reactor effluent, herein referred to as rich cycle gas, resulting from the vapor phase reaction of ethylene and molecular oxygen. In general, the invention contemplates separation of ethylene oxide from other components of the rich cycle gas by scrubbing with a non-aqueous liquid absorbent and separating the ethylene oxide absorbate by distilling the absorbent therefrom. Recovered absorbent may then be condensed and recycled to the absorber, thus providing an absorbent inventory for continuous process operation. Optionally, economies of energy requirements may be effected by heat exchange between the feed and overhead or bottoms streams of the absorbent recovery column, hereinafter called the "stripper." Prior art processes employing a wet system require that stripping be conducted at low pressure to minimize ethylene oxide hydrolysis. Since the present invention involves a dry system, this restriction is unnecessary. Thus, the inventive process permits absorbent to be recovered at a higher pressure than in the wet process and thus reduces the power required to recycle absorbent. Higher recovery pressure permits higher temperatures and reduces refrigeration costs. This latter feature is advantageous because lower levels of refrigeration are more costly, i.e. the cost per unit of heat abstracted is inversely related to temperature. The stripper is preferably operated at a lower pressure than the scrubber. Stripper pressure is largely set by the maximum temperature to which concentrated ethylene oxide can be heated without degradation and/or polymerization. This generally is less than 250° F. and desirably less than 200° F. Two or more partial stripping stages can be used.

The present invention contemplates use of all absorbents other than water which are suitable for attainment of the objects of this invention as hereinabove set forth. Accordingly, the invention contemplates use of liquid absorbent materials such as methane, ethane, ethylene and halogenated hydrocarbons such as those indicated by the trademark "Freon" etc. as well as mixtures of any two or more of the foregoing. In absorber-stripping systems of the type employed in the process of this invention, however, it would be noted that the term "absorbent" as this is hereinabove and hereafter used, is not quite synonymous with the term "scrubbing medium" which refers to the totality of the material fed to the absorber for recovery of ethylene oxide in the rich cycle gas. Since the absorption is not completely selective, materials in the rich cycle gas other than ethylene oxide are absorbed along with the desired ethylene oxide product and, correspondingly, the stripping operation is not completely selective i.e., a complete separation between ethylene oxide and other materials present in the rich absorbent is not achieved even though ethylene oxide recovery can closely approach or even attain 100%. These other materials build-up to an equilibrium concentration and, constitute, together with the absorbent, the totality of the scrubbing medium. Thus, in the system contemplated in this invention the absorbent (or mixture of absorbents) would be the predominant component (or components) in the scrubbing medium and other components indigenous to the ethylene oxide manufacturing process are unavoidably present and can be present in substantial quantity. Accordingly, the scrubbing medium contains at least some ethylene, carbon dioxide and oxygen since there are significant components of the recycle gas. In this regard it should be noted that in any scrubbing operation wherein the absorbent is recycled, the scrubbing medium composition is one which approximates a composition which is in equilibrium with the lean gas leaving the top of the scrubber.

The ballast gas employed in the ethylene oxide manufacturing process is also a component of the rich cycle gas and in the system of the type herein contemplated is a component of the scrubbing medium and of the lean recycle gas returned to the ethylene oxide manufacturing operation. By "ballast gas" is meant a component (or mixture of components) other than the reactants (ethylene and oxygen) unavoidably introduced or deliberately maintained in the system for the purposes of controlling reactant concentrations so as to avoid flammability problems and for promotion of transfer of the heat of reaction away from the reaction mixture to maintain the reaction temperature and consequently to control conversion and selectivity. Conventional ballast gases include such materials as methane, ethane, argon, nitrogen, carbon dioxide, helium and mixtures of any two or more of the foregoing. It is, of course, apparent that there is a substantial degree of overlap between suitable absorbents and suitable ballast gases. In the practice of this invention it is therefore preferred to employ the ballast gas of choice as the absorbent since this completely avoids introduction of otherwise extraneous components to the recycle gas.

The nature of the ballast, in part, depends upon the source of molecular oxygen used. When air is the source, the inerts unavoidably present in the air feed stream (nitrogen together with relatively small amounts of carbon dioxide and argon) usually provide the ballast. When high purity oxygen (85% or more oxygen by volume) or enriched air is used, the ballast gas can be the same as when air is used or can readily be varied to include the other ballast gas components named above, in addition to, or even in place of those common to the air process. Mixed ballasts are contemplated by the invention and advantage can be obtained from use of mixed ballasts in order to modify the refrigeration temperature needed for the recovery system in this invention. Thus, in an air system, a mixed ballast (e.g., a ballast system comprising nitrogen plus ethane) can be used to raise the refrigeration temperature to a level higher than that which would be necessary were the usual nitrogen ballast system to be employed. It should therefore be noted that the present invention incorporates the principle of varying ballast composition to achieve an optimum process over a wide range of otherwise usable cryogenic temperatures.

The absorber-stripper system contemplated for use in the process of this invention is of the type conventionally employed in ethylene oxide manufacturing processes except for the nature of the absorbent used and for the manner in which the stripper is operated. In conventional processes, ethylene oxide is dissolved in an aqueous absorbent and is fed to a stripper, stripped therein with steam and ethylene oxide is taken as the overhead product from the stripper for further processing and purification if required. At the recovery conditions contemplated, however, ethylene oxide is relatively non-volatile. Accordingly, the absorbent is taken overhead and condensed for recycle while ethylene oxide, in concentrated form, is the bottoms product from the stripper and can either be used as such or further processed and purified in conventional manner.

Generally speaking, the desired hydrocarbon absorbents suitable for the practice of this invention are those having one or two carbon atoms, viz methane, ethane and ethylene. The latter two are by far the preferred species because when the latter predominate in the scrubbing medium, volatility and reactivity characteristics appear optimized. Predomination of methane or of hydrocarbons containing three or more carbon atoms in the scrubbing medium is less satisfactory. Methane's high volatility requires expensive low-level refrigeration facilities and hydrocarbons having three or more carbon atoms per molecule are too reactive as components of the lean recycle gas which is reintroduced into the ethylene oxide producing reaction and are hence undesirable for that reason. It should, however, be recognized that the board concept of this invention includes use of methane as well as propane, propylene and the like. Use of the halogenated hydrocarbons, illustratively the "Freons" is advantageous from the standpoint of operability but is generally restricted because of the cost of these materials. Carbon dioxide can be regarded as a desirable alternate to those discussed above. However, ethane and ethylene are, by far the preferred absorbents, i.e., they are especially preferred as the predominant components of the scrubbing medium.

The use of liquid ethane as the absorbent, i.e., as the predominant component of the scrubbing medium, is exceptionally advantageous in the practice of the present invention since it as important advantages over prior art use of water. It is well-known that a solution of a gas (absorbate) in a liquid (absorbent) exerts a definite partial pressure of such gas at a given temperature and concentration and that the ratio of the concentration of the gas in the vapor phase to the concentration of the gas in the liquid phase at constant pressure and temperature is a constant at equilibrium. In this invention, the equilibrium constant for ethylene oxide in liquid ethane is approximately $\frac{1}{10}$ the value of the equilibrium constant for ethylene oxide in water in the conventional system. Therefore, it follows that ethylene oxide is considerably more soluble in liquid ethane than in water. Accordingly, the use of liquid ethane makes possible the recovery of ethylene oxide with a significantly reduced absorbent inventory. The latter feature reduces capital expenditures otherwise needed and provides operating economies.

The greater absorption power of liquid ethane is undeniably an asset in separating ethylene oxide from other components of the rich cycle gases entering the scrubber. In attempting subsequently to separate the ethane absorbent from the ethylene oxide by stripping the ethane therefrom, it is recognized that stripping is the reverse of absorption and is aided by lesser, rather than greater, absorption power. However, this increased difficulty is to a large extent offset by the relatively low value of the molar latent heat of vaporization of ethane. When this value, i.e., 2250 calories is compared with that for water, i.e., 10,726 calories (both values determined at 15° C.), it is readily seen that almost a five-fold advantage in latent heat requirements is enjoyed by ethane.

It is thus seen that while the use of liquid ethane as an absorbent entails a stripping operation wherein the entire absorbent inventory must be taken as an overhead, there is a partial offset to such disadvantage because of the lesser quantity of absorbent needed and because of the latent heat difference.

Because of the temperatures involved, however, the rich cycle gas must be dry and, correspondingly, the absorbent and scrubbing medium would also be dry in the absence of deliberate water addition which is obviously disadvantageous. The use of the word "dry" however cannot mean complete absence of water and as herein used refers to stream having a dew point (the temperature at which water starts to condense at the system pressure) less than about −85° F.

The economic attractiveness of the invention is enhanced by the fact that the essentially dry recovery system employed substantially eliminates the glycol losses common to water scrubbing. Hydrolysis of at least a portion of the ethylene oxide absorbate is an inherent reaction of the latter operation and a source of product loss. Thus, the use of liquid absorbent other than water, such as ethane, provides for the most part a simple and effective solution to this problem. It is recognized that reaction of ethylene and oxygen under ethylene oxide forming conditions necessarily results in the formation of some water vapor. Accordingly, drying of the rich cycle gas coming from the reactor is essential prior to entering the cryogenic zone in order to avoid freeze-up. In this regard, passage of the rich cycle gas through 3 angstrom molecular sieves is a preferred drying technique. The dried, rich cycle gas may then be safely cooled to the cryogenic temperature and introduced to the absorber.

Molecular sieve drying is readily accomplished using known techniques. Drying temperatures employed are from about 100° F. to about 500° F., and preferably from about 130° F. to about 300° F. at pressures between about 200 and 400 p.s.i.a. and preferably from about 225 to about 350 p.s.i.a. Two or more desiccant beds connected in parallel are used, one being used for drying while the other is being regenerated. Each bed normally contains from 200 to 400 lbs. of desiccant per lb. mol of water to be removed per hour. Under these conditions, each desiccant bed can be used on a 3 to 8 hour cycle, i.e., they can be operated from 3 to 8 hours before regeneration is needed. Standard regeneration techniques are used.

An additional advantage of non-aqueous scrubbing is that the scrubber and absorbent handling equipment need not be constructed of stainless steel as in the case of water scrubbing. Decreased corrosivity is a result of both the absence of water and the lower temperatures.

The absorption of ethylene oxide from the reactor effluent takes place in conventional fractionation-type equipment containing from 2 to 25 preferably from 4 to 20 theoretical contacing stages. Operating temperature scrubbing medium rate (expressed as $V/L$ ratio) in the absorption varies depending upon the absorption agent (i.e., the absorbent) as well as upon the composition of the scrubbing medium which, in turn, is a function of the ballast gas used in the ethylene oxide manufacturing step. Temperature at the absorber overhead essentially the absorbent inlet temperature can vary from −100° F. to 0° F. and the scrubbing medium rate (expressed as $V/L$ where V is the moles per unit of time of vapor leaving the absorber and L is the moles per unit of time of scrubbing medium fed to the absorber) can vary from 0.1 to 1000. In the preferred system where ethane is both the ballast gas in the ethylene oxide producing reaction and the absorbent, suitable scrubbing medium temperatures (at the inlet to the absorber) are in the temperature range from about −30° F. to about 0° F. and are preferably −25° F. to −10° F. In other absorbent systems, or with an ethane absorbent in other than ethane ballasted systems other temperatures will be encountered but temperature at absorber inlet will generally be within the range of −100° F. to about 0° F., desirably within the range of −85° F. to about 0° F., and preferably −60° F. to 0° F. with operation in the temperature ranges set forth in the preceding sentence being especially preferred.

Stripping of the absorbent from the ethylene oxide product also takes place in conventional fractionation-type equipment containing from 5 to 50 preferably from 10 to 30 theoretical contacting stages. Reflux ratio (expressed as moles of reflux per mole of net overhead product) is preferably 0.1 to 5.0. Temperature employed of course depends on stripper pressure and has earlier been described. The stripper overhead is cooled and condensed to provide the scrubbing medium for the absorber. The quantity of refrigeration required is reduced by subjecting the rich cycle gas to preliminary cooling which also promotes the efficiency of the drying operation. As in the stripping operation wherein economies may be effected by heat exchange between the feed and overhead or bottoms recycle streams, so too economies may be effected by heat exchange between the rich cycle gas (reactor effluent) and the lean cycle gas (overhead gas from the scrubber). In the latter case, gas-gas exchanger provide not only the preliminary cooling of the rich cycle gas after drying but also the preliminary heating of the lean cycle gas before recycling to the reactor.

The invention is particularly applicable to the recovery of ethylene oxide produced in an ethane ballasted system. A description of such a system is set forth in copending U.S. application Ser. No. 600,407 filed Dec. 9, 1966. A natural advantage of such a process is the high ethane partial pressure in the lean cycle gas which permits an increased refrigeration level in the absorber.

DESCRIPTION OF THE DRAWING

The drawing depicts a flow diagram of an illustrative ethylene oxide process embodying the present invention. As shown, feed streams of ethylene gas and an oxygen-containing gas are introduced to a reactor where controlled partial oxidation conditions are maintained. Under these conditions and in the presence of a supported silver catalyst, ethylene oxide and other products of oxidation are formed. While the reactor effluent comprises at most a few volume percent of ethylene oxide, it is from this "rich" gas that product ethylene oxide is recovered, thus making possible a valuable commercial process and giving rise to an important chemical industry. Since the rich gas is treated subsequently to remove most of the ethyleneoxide and then recycled to the reactor, it is generally referred to as "rich cycle gas." This rich cycle gas is cooled, compressed, and then passed through a drier, preferably containing beds of three angstrom molecular sieves. Alternate driers (not shown) are usually provided to permit continuous operation of the process while drier regeneration is being effected. Molecular sieves can be regenerated by passage of hot air, superheated steam or flue gas therethrough or simply by the application of heat. Preliminary dried and cooled rich cycle gas is fed to the absorber or scrubber where it comes into contact with a liquid absorbent other than water, such as ethane. Conditions in the absorber are maintained with a view toward maximizing the temperature of the lean cycle gas and minimizing the quantity of absorbent required. Ethylene oxide is separated from the remaining more volatile components of the rich cycle gas by absorption in the liquid absorbent and leaves the absorber in the rich liquid bottoms. Lean cycle gas leaves the absorber in the overhead stream and after removal of a small amount of purge gas is recycled to the reactor. The dashed block enclosing the cooler indicates optional gas-gas heat exchange between the dried rich cycle gas and the lean cycle gas. The rich liquid bottoms from the absorber comprising liquid absorbent and absorbed ethylene oxide is fed to the stripper where reduced pressure conditions facilitate removal of ethane as the overhead gas. Heat can be supplied to the stripper by conventional reboiling facilities (not shown). This gas then passes to a condenser and condensate therefrom is recycled to the absorber where it serves as the scrubbing medium. The dashed block enclosing the condenser indicates optional heat exchange between the feed and overhead streams of the stripper. It should be understood that heat exchange economies may optionally be effected between the feed and bottoms streams of the stripper. Generally, process calculations will dictate which option is more economical. The stripper bottoms comprises a relatively pure liquid ethylene oxide product which may be sent to further refining if desired.

DESCRIPTION OF PREFERRED EMBODIMENTS

For the purpose of illustrating the inventive concept and providing a clearer understanding for those skilled in the art to enable them to practice the invention, the following examples are provided. The three examples presented represent different embodiments of the invention. Example I is illustrative of the especially preferred operation wherein the ethylene oxide production step is conducted in the presence of an ethane ballast and the absorbent is ethane, i.e., the scrubbing medium predominates in ethane. Example II illustrates ethylene oxide production with methane ballast and recovery of the ethylene oxide with the absorbent agent being a mixture of ethylene and methane with a small amount of ethane gradually introduced as impurity in the ethylene feedstock until it builds up to the equilibrium concentrations given below. Example III represents operation with a predominantly argon ballast and ethylene oxide absorption with a mixed ethylene-ethane absorbent agent. Each example represents continuous operation after steady-state conditions are achieved and, accordingly, in each example, the scrubbing medium has an overall composition approaching that which is in equilibrium with the gas recycled to the ethylene oxide reaction. Thus, for example, in Example III, the scrubbing medium also contains substantial amounts of argon and in all examples contains significant quantities of carbon dioxide and other materials. Conditions employed in the ethylene oxide production are set forth in Table I below:

TABLE 1

| Example No. | I | II | III |
|---|---|---|---|
| Temperature, °C | 235 | 235 | 245 |
| Pressure, p.s.i.a | 300 | 265 | 265 |
| Reaction time, sec | 6 | 12 | 6 |

Reactor effluent compositions are set forth in Table II below. In each example, the reactor effluents are compressed, dried and then passed to an absorber. Compressor outlet pressures are 50 p.s.i. above, reactor pressures to provide adequate driving force to cause the recycle stream to be returned to the reactor after the processing hereinafter described. The drying is carried out with 3 angstrom molecular sieves at 150° F. and at compressor discharge pressure. The quantity of sieves in the drier is sufficient to provide 260 lbs. per lb. mol of water removed per hour and an on stream time of 4 hours is used before the sieves are regenerated.

TABLE II
Reactor effluent composition, mol percent

| Example No. | I | II | III |
|---|---|---|---|
| Component: | | | |
| Ethylene oxide | 1.8 | 3.0 | 1.4 |
| Ethylene | 14.5 | 27.1 | 18.1 |
| Oxygen | 8.2 | 4.0 | 5.5 |
| Ethane | 53.6 | 1.9 | 1.0 |
| Nitrogen | 0.5 | 5.5 | 22.7 |
| Argon | 12.3 | 18.1 | 44.0 |
| Carbon dioxide | 7.3 | 8.3 | 5.8 |
| Water | 1.8 | 2.0 | 1.5 |
| Methane | | 30.1 | |
| Total | 100.0 | 100.0 | 100.0 |

The drying operation hereinabove described reduces the water dew point (the temperature at which water condenses) in each example to $-100°$ F. but does not otherwise significantly affect composition. After drying, the effluent is fed to the bottom of an absorber containing in each case 7 theoretical vapor-liquid contacting stages (20 real plates). A scrubbing medium is fed to the top of the absorber. Scrubbing medium compositions, temperatures and rates (expressed in units of mols per 100 mols of ethylene oxide fed to the absorber) are set forth in Table III. Scrubber pressure in Example I is 310 p.s.i.a. Scrubber pressure in Examples II and III is 275 p.s.i.a.

TABLE III.—SCRUBBING MEDIUM

| Example No. | I | II | III |
|---|---|---|---|
| Temperature, °F | −10 | −70 | −85 |
| Flow rate | 545 | 25 | 25 |
| Composition, mol percent: | | | |
| Ethane | 81.5 | 4.6 } | 67.0 |
| Ethylene | 13.5 | 67.4 } | |
| Carbon dioxide | 3.0 | 10.7 | 11.5 |
| Nitrogen | | 1.6 | 4.0 |
| Oxygen | 2.0 } | | |
| Argon | | 5.9 | 17.5 |
| Methane | | 9.8 | |
| Total | 100.0 | 100.0 | 100.0 |

As a result of the contact within the absorber, ethylene oxide is absorbed and, in each example, rich absorbent is withdrawn from the bottom of the absorber and fed to a stripper containing 20 theoretical vapor-liquid contacting stages (50 real plates). An ethylene oxide free cycle gas is withdrawn from the absorber overhead and is returned to the ethylene oxide producing reactor after admixture with fresh ethylene and oxygen feeds. The stripper is operated at 90 p.s.i.a. and produces an ethylene oxide bottoms product containing only minor amounts of contaminants. Stripper bottoms temperature is 150° F. The stripper overhead is condensed, sufficient condensate being returned to the stripper as reflux to provide a reflux ratio (mols of reflux per mol of net overhead product) of 1.9 in Example I and 0.5 in Examples II and III. The net overhead product of the stripper is the hereinabove described scrubbing medium.

The absorber overhead (i.e., the gas recycled to the reactor) is characterized in Table IV as also is the rich absorbent. Flow rates are expressed in the same units as used in the Table III.

TABLE IV.—ABSORBER PRODUCTS

| Example No | I | II | III |
|---|---|---|---|
| Lean cycle gas (overhead) flow rate | 5,350 | 3,170 | 6,930 |
| Composition, mol percent: | | | |
| Ethylene | 15.1 | 28.5 | 18.6 |
| Oxygen | 8.5 | 4.2 | 5.7 |
| Ethane | 55.6 | 2.0 | 1.0 |
| Nitrogen | 0.5 | 5.8 | 23.5 |
| Argon | 12.8 | 19.0 | 45.3 |
| Carbon dioxide | 7.5 | 8.7 | 5.9 |
| Methane | | 31.8 | |
| Total | 100.0 | 100.0 | 100.0 |
| Rich absorbent (bottoms): | | | |
| Flow rate | 645 | 125 | 125 |
| Temperature, °F | 0 | −40 | −65 |
| Composition, mol percent: | | | |
| Ethylene oxide | 15.5 | 80.0 | 80.0 |
| Ethane | 68.9 } | 14.5 | 13.4 |
| Ethylene | 11.4 } | | |
| Carbon dioxide | 2.5 | 2.1 | 2.3 |
| Nitrogen | } | 0.3 | 0.8 |
| Oxygen | 1.7 } | | |
| Argon | } | 1.1 | 3.5 |
| Methane | | 2.0 | |
| Total | 100.0 | 100.0 | 100.0 |

Having thus described the invention so that others skilled in the art may be able to understand and practice the same, it is expressly understood that various changes may be made in the process of this invention and that materials other than those specifically described herein may be employed as ballast gas and/or absorbent without departing from the spirit and scope of the invention. In this respect it may be noted that various changes in the disclosed arrangement of process equipment may be made which are within the ken of those skilled in the art, such as, providing a small stripper thus reducing the load on molecular sieve driers, providing more than one stripping stage, relocating the recycle compressor as well as other variants.

What is claimed is:

1. A process for recovering ethylene oxide from the gaseous effluent of the vapor phase reaction of ethylene and oxygen under ethylene oxide forming conditions which process comprises drying said gaseous effluent to a dew point of less than about −85° F. and scrubbing the dried effluent with a liquid absorbent predominating in a member of the group consisting of ethane, ethylene, mixtures of the foregoing and mixtures of at least one of the foregoing with methane to produce an absorbate liquid rich in ethylene oxide and a scrubbed cycle gas lean in ethylene oxide, said liquid absorbent being the overhead obtained by stripping the absorbate liquid to recover a liquid ethylene oxide bottoms, the stripping operation being conducted at a pressure such that the ethylene oxide bottoms temperature is less than 250° F.

2. A process in accordance with claim 1 wherein the gaseous effluent is dried by contact of the effluent with an adsorbent, said adsorbent being 3 angstrom molecular sieves.

3. A process in accordance with claim 1 wherein the stripping operation is conducted at a pressure such that the ethylene oxide bottoms temperature is less than 200° F.

4. A process in accordance with claim 1 wherein the scrubbing is conducted at temperature within the range of from −85° F. to approximately 0° F.

References Cited

UNITED STATES PATENTS

| 2,430,443 | 11/1947 | Becker | 260—348.5 |
| 2,437,930 | 3/1948 | Bergsteinsson et al. | 260—348.5 |
| 2,622,088 | 12/1952 | Thomas | 260—348.5 |

NORMA S. MILESTONE, Primary Examiner

U.S. Cl. X.R.

260—348.5 R